United States Patent
Hirata et al.

(10) Patent No.: US 10,265,831 B2
(45) Date of Patent: Apr. 23, 2019

(54) METHOD FOR MANUFACTURING LENS, METHOD FOR MANUFACTURING MOLDING DIE FOR LENS, METHOD FOR MANUFACTURING MIRROR, METHOD FOR MANUFACTURING MOLDING DIE FOR MIRROR, LENS AND MOLDING DIE FOR LENS

(71) Applicant: MAXELL, LTD., Kyoto (JP)

(72) Inventors: Koji Hirata, Osaka (JP); Masahiko Yatsu, Osaka (JP); Shuji Kato, Osaka (JP); Yuki Matsumiya, Osaka (JP)

(73) Assignee: Maxell, Ltd., Kyoto (JP)

( * ) Notice: Subject to any disclaimer, the term of this patent is extended or adjusted under 35 U.S.C. 154(b) by 37 days.

(21) Appl. No.: 15/522,501

(22) PCT Filed: Jan. 27, 2015

(86) PCT No.: PCT/JP2015/052132
§ 371 (c)(1),
(2) Date: Apr. 27, 2017

(87) PCT Pub. No.: WO2016/120985
PCT Pub. Date: Aug. 4, 2016

(65) Prior Publication Data
US 2017/0326705 A1 Nov. 16, 2017

(51) Int. Cl.
*B24B 49/10* (2006.01)
*B24B 49/12* (2006.01)
(Continued)

(52) U.S. Cl.
CPC .............. *B24B 49/12* (2013.01); *B24B 13/00* (2013.01); *B24B 13/01* (2013.01); *B24B 13/04* (2013.01);
(Continued)

(58) Field of Classification Search
CPC ......... B24B 49/12; B24B 13/00; B24B 13/01; B24B 13/04; G02B 3/00; G02B 3/04
(Continued)

(56) References Cited

U.S. PATENT DOCUMENTS 3,507,075 A * 4/1970 Schmidt ............... B23Q 35/128
359/447
4,528,780 A * 7/1985 Halberschmidt ......... B24B 9/10
144/137
(Continued)

FOREIGN PATENT DOCUMENTS

JP 09-029598 A 2/1997
JP 09-300189 A 11/1997
(Continued)

OTHER PUBLICATIONS

International Search Report of PCT/JP2015/052132 dated Mar. 31, 2015.
(Continued)

*Primary Examiner* — George B Nguyen
(74) *Attorney, Agent, or Firm* — Mattingly & Malur, PC

(57) ABSTRACT

Methods for manufacturing a rotational non-axisymmetric lens which is manufactured by grinding using a machining tool, manufacturing a molding die for the lens, manufacturing a rotational non-axisymmetric mirror, and manufacturing a molding die for the mirror are provided. The provided methods are methods for manufacturing a rotational non-axisymmetric lens partially including a non-axisymmetric surface, manufacturing a molding die for the lens, manufacturing a rotational non-axisymmetric mirror partially including a non-axisymmetric surface, and manufacturing a molding die for the mirror. When a rotational non-axisymmetric surface is formed while scanning a surface of a workpiece by grinding or cutting means, the rotational non-axisymmetric surface is ground or cut by the grinding or (Continued)

cutting means while scanning the surface with movement in a direction along a meridional surface of the rotational non-axisymmetric surface.

10 Claims, 11 Drawing Sheets

(51) Int. Cl.
    *B24B 13/04* (2006.01)
    *G02B 3/00* (2006.01)
    *G02B 3/04* (2006.01)
    *G02B 5/10* (2006.01)
    *B24B 13/00* (2006.01)
    *B24B 13/01* (2006.01)

(52) U.S. Cl.
    CPC .................. *G02B 3/00* (2013.01); *G02B 3/04* (2013.01); *G02B 5/10* (2013.01)

(58) Field of Classification Search
    USPC .............................................................. 451/6
    See application file for complete search history.

(56) References Cited

U.S. PATENT DOCUMENTS

| | | | |
|---|---|---|---|
| 5,748,482 A | 5/1998 | Nishimura | |
| 5,895,311 A | 4/1999 | Shiotani et al. | |
| 5,934,972 A * | 8/1999 | Gottschald | B24B 47/225 451/41 |
| 5,971,836 A * | 10/1999 | Kogure | B24B 27/0053 257/E21.237 |
| 6,033,987 A * | 3/2000 | Lin | B24B 37/04 216/88 |
| 6,122,999 A | 9/2000 | Durazo et al. | |
| 6,785,585 B1 * | 8/2004 | Gottschald | B24B 9/146 351/110 |
| 2003/0157211 A1 | 8/2003 | Tsunetomo et al. | |
| 2010/0195061 A1 | 8/2010 | Takaura et al. | |
| 2013/0271851 A1 * | 10/2013 | Souma | G02B 3/04 359/708 |
| 2013/0335588 A1 * | 12/2013 | Matsusaka | G02B 3/00 348/220.1 |

FOREIGN PATENT DOCUMENTS

| | | |
|---|---|---|
| JP | 09-323252 A | 12/1997 |
| JP | 10-328995 A | 12/1998 |
| JP | 11-188591 A | 7/1999 |
| JP | 2003-276030 A | 9/2003 |
| JP | 2004-017166 A | 1/2004 |
| JP | 2004-94175 A | 3/2004 |
| JP | 2009-086315 A | 4/2009 |
| JP | 2010-260775 A | 11/2010 |
| JP | 2011-036973 A | 2/2011 |

OTHER PUBLICATIONS

Japanese Office Action received in corresponding Japanese Application No. 2016-571536 dated Sep. 4, 2018.

* cited by examiner (B)

FLY MACHINING (A)

SLOW SLIDE SERVO MACHINING

METHOD FOR MANUFACTURING LENS, METHOD FOR MANUFACTURING MOLDING DIE FOR LENS, METHOD FOR MANUFACTURING MIRROR, METHOD FOR MANUFACTURING MOLDING DIE FOR MIRROR, LENS AND MOLDING DIE FOR LENS

TECHNICAL FIELD

The present invention relates to an optical element, such as a lens and a reflection mirror formed by cutting, polishing, grinding or plastic injection molding, and, more particularly, relates to a method for manufacturing an optical element having a lens surface and a mirror surface shaped into a free curved surface, an eccentric aspheric surface or others.

BACKGROUND ART

A projection-type image display device capable of projecting a large favorable projection image even in a short distance has become widespread in recent years. The image display devices such as not only a so-called projector that projects a desired image on a wall surface or a screen but also an image display device that is combined with an indoor lighting instrument to emit light together with the image or others and also a vehicular lighting device capable of projecting various pieces of information including a vehicle travel direction onto a road surface where the vehicle is traveling have been studied.

According to the following Patent Document 1, a projection optical device has been already known, the projection optical device having a projection lens composed of a first optical system including a transmittal refractive element and a second optical system including a reflective refractive element, some of lenses of the first optical system being housed in a lower space whose lower limit is a lower end of the second optical system.

According to the following Patent documents 2 and 3, methods each for manufacturing an aspherical optical element have been already known, the methods being for manufacturing an aspherical surface lens in which a molding die for an aspherical surface lens is manufactured by a so-called etching technique and for manufacturing a glass aspherical surface lens by molding and polishing an aspherical surface through a glass molding process on only an aspherical surface of a spherical glass lens.

According to the following Patent Document 4, a method for machining an aspherical surface lens in which a track of an aspherical surface is shaped by using a cam-type spherical center polisher, a device for the machining method and others have been already known.

RELATED ART DOCUMENTS

Patent Documents

Patent Document 1: Japanese Patent Laid-Open Publication No. 2009-86315
Patent Document 2: Japanese Patent Laid-Open Publication No. 2003-276030
Patent Document 3: Japanese Patent Laid-Open Publication No. 2010-260775
Patent Document 4: Japanese Patent Laid-Open Publication No. 2004-17166

SUMMARY OF THE INVENTION

Problems to be Solved by the Invention

However, in the above-described conventional techniques, when a lens molding die (insert) having a lens surface shape rotational symmetrical with respect to an optical axis is machined by, for example, a multispindle machining device shown in FIG. 10 (a five-spindle machining device in the drawing), a desired shape is obtained by clamping and rotating a workpiece surface around a C axis, attaching a cutting tool to a bed that is movable in the X, Y, and Z directions as shown in FIG. 11(a), and cutting the surface. On the other hand, when a lens surface or a mirror surface which cannot be machined while rotating a workpiece surface with a free curved surface, an eccentric aspherical surface, etc., a desired molding shape is obtained by attaching a rotary cutting blade to a bed that is movable in the X, Y, and Z directions as shown in FIG. 11(b) and rotating the blade at high speed. However, generally, the rotational asymmetric workpiece surface has low shape accuracy, and a surface roughness of the surface is deteriorated. For this reason, the molding die surface is polished after the cutting in order to reduce the surface roughness. However, it has been confirmed that the focus performance is adversely affected by an irregularity slightly formed on the lens surface during the machining process. This result has led to the present invention.

That is, the present invention has been made in consideration of the above-described problems in the conventional techniques, and an object of the present invention is to provide a method for manufacturing an optical element with a rotational non-axisymmetric free curved surface or eccentric aspherical surface, the optical element having superior optical properties, in which manufacturing method a molding die surface obtained by cutting or grinding with a machining tool is manufactured by grinding and machining, and, more specifically, is to provide a method for manufacturing an optical element with a rotational non-axisymmetric free curved surface or eccentric aspherical surface, the manufacturing method enabling manufacturing of a rotational non-axisymmetric free curved surface or eccentric aspherical surface lens and a molding die for the lens and manufacturing of a rotational non-axisymmetric free curved surface or eccentric aspherical surface mirror and a molding die for the mirror.

Means for Solving the Problems

In order to achieve the above-described object, the present invention provides a method for manufacturing an element with a rotational non-axisymmetric free curved surface or eccentric aspherical surface described in the following claims. More specifically, the method is methods for manufacturing a partially rotational non-axisymmetric free curved surface or eccentric aspherical surface lens and a molding die for the lens and for a partially rotational non-axisymmetric free curved surface or eccentric aspherical surface mirror and a molding die for the mirror. According to the method, when an aspherical surface is formed while scanning a workpiece surface with a grinding or cutting means, the rotational non-axisymmetric free curved surface or eccentric aspherical surface is ground or cut by the grinding or cutting means while being moved and scanned in a direction along a meridional surface of the rotational non-axisymmetric free curved surface or eccentric aspherical surface lens.

Effects of the Invention

The above-described present invention provides a method for manufacturing an optical element with a rotational non-axisymmetric free curved surface or eccentric aspherical surface, the optical element being manufactured by forming a molding die surface by cutting or grinding with a machining tool and having a superior optical property. More specifically, the above-described present invention provides such a superior effect in practical as providing a method for manufacturing an element with a rotational non-axisymmetric free curved surface or eccentric aspherical surface enabling manufacturing of a rotational non-axisymmetric free curved surface or eccentric aspherical surface lens and a molding die for the lens and manufacturing of a rotational non-axisymmetric free curved surface or eccentric aspherical surface mirror and a molding die for the mirror.

BRIEF DESCRIPTIONS OF THE DRAWINGS

BEST MODE FOR CARRYING OUT THE INVENTION

A method for manufacturing an optical element with a rotational non-axisymmetric free curved surface according to an embodiment of the present invention, more specifically, a method for manufacturing a lens and a reflection mirror each including a rotational non-axisymmetric free curved surface will be described in detail below. In advance of this, the accompanied drawing FIG. 1 shows an overall outer appearance of a projection-type image display device (projector) which is an example to which the rotational non-axisymmetric free curved surface lens and the rotational non-axisymmetric free curved surface reflection mirror are applied.

Figure 1:
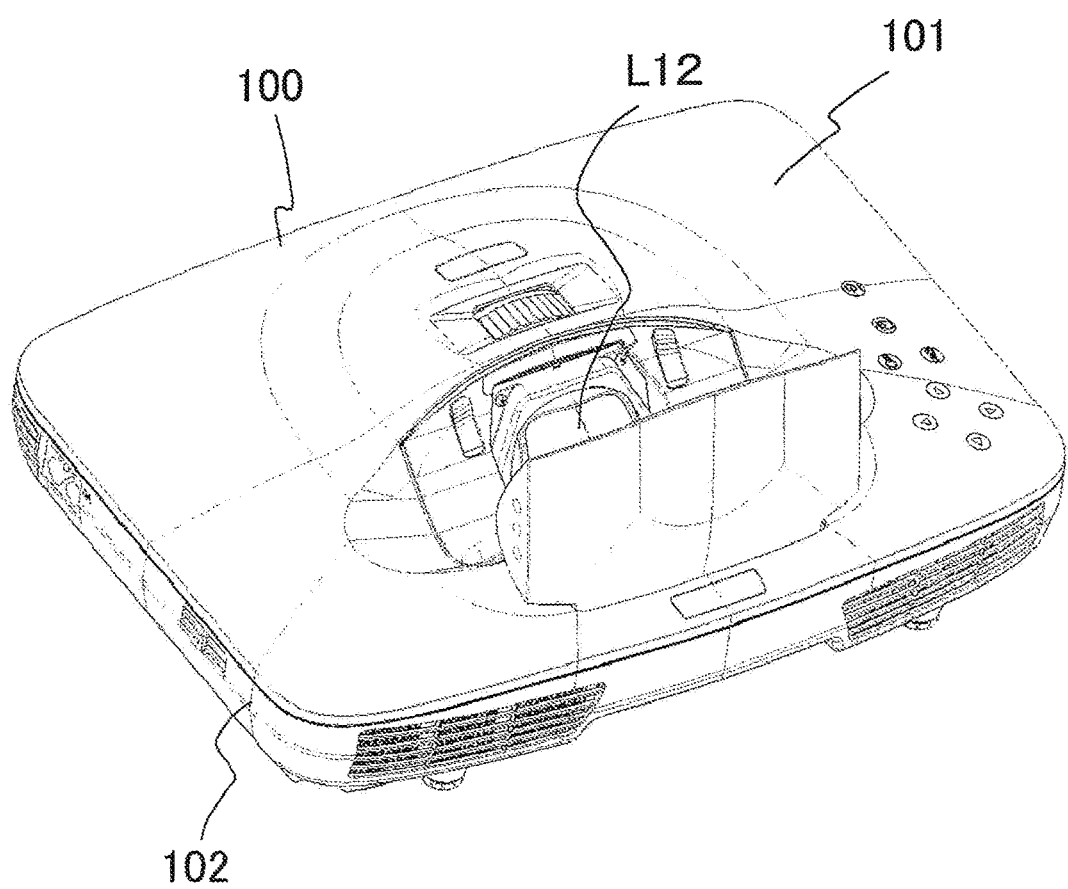
FIG. 1 is a perspective view illustrating an overall outer appearance of a projection-type image display device which is an example of a device mounted with a rotational non-axisymmetric free curved surface lens and a rotational non-axisymmetric free curved surface mirror according to an embodiment of the present invention.

In FIG. 1, a reference character 100 denotes the projection-type image display device, and reference characters 101 and 102 denote a top cover and a bottom cover of the device, respectively. As clearly seen from FIG. 1, to a part of the top cover 101, a window 103 which is openable at the use of the device is attached so as to be openable/closable. Note that FIG. 1 shows an opening state of the window 103, and a rotational non-axisymmetric free curved surface lens making up a projection optical system described below is denoted by a reference character L12.

Although not shown, an internal space formed by the top cover 101 and the bottom cover 102 houses, for example, an LED and a lamp, which serve as a light source, an optical modulator (e.g., an image display element such as a DLP (Digital Light Processing) or a liquid crystal panel) that modulates light emitted from the light source into image light based on an external image signal, etc., and a so-called aspherical oblique projection optical system including a rotational non-axisymmetric free curved surface lens and a rotational non-axisymmetric free curved surface mirror, the projection optical system obtaining a favorable projection image because the image light can be projected onto a wall surface so as to reduce a trapezoidal distortion, etc., even in an extremely small distance (even at a large tilt angle), and besides, houses various circuit elements including a power supply circuit and an control circuit that supply necessary power and control signals to the above-described components, and houses a cooling fan and others that leads heat of the circuit elements to outside of the device, which are components making up the projection-type image display device.

Figure 2:
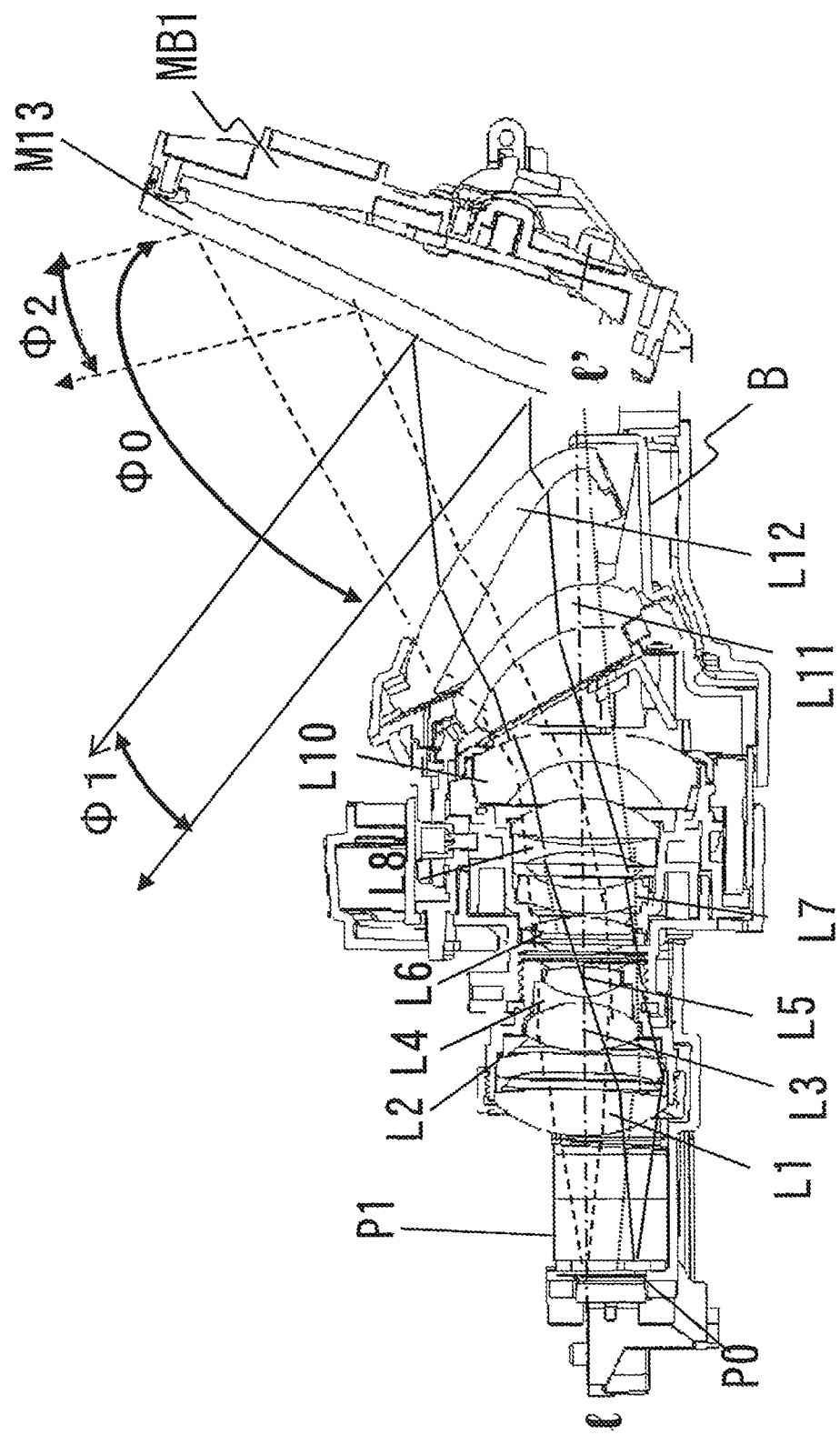
FIG. 2 is a lens layout explaining an operation principle of a projection lens in an oblique projection optical system.

Next, FIG. 2 is a lens layout explaining an operation principle of a projection lens in the above-described oblique projection optical system. The oblique projection optical system is made up of 12 lenses denoted by reference characters L1 to L12 and one mirror denoted by a reference character M13. Here, each of a reflection surface of the mirror M13 and lens surfaces of the lenses denoted by the reference characters L11 and L12 is shaped into a rotational non-axisymmetric free curved surface. Therefore, even the oblique projection optical system which projects an image at an extremely large tilt angle can obtain a projection image whose trapezoidal distortion is reduced. Hence, this manner provides a degree of freedom in designing as high as about five times a degree of freedom in an aspherical surface, and allows favorable aberration correction.

Light emitted from a light source (a semiconductor light source such as LED in this example although not shown) located at an opposite surface of a prism optical element denoted by a reference character P0 is totally reflected on a prism surface, enters an image display element denoted by a reference character P1, is converted into image light flux by the image display element, transmits through the prism surface, and enters a projection lens. The image light flux (denoted by a reference character "φ0" as a whole) from the image display element P1 (reflective image display element) transmits through different lens points in respective projection lenses with respect to an imaging position on a projection surface. The free curved surface mirror M13 and the free curved surface lenses L11 and L12 are located to be upper than an optical axis shared by most of other lenses, and therefore, an unnecessary lens effective region can be eliminated to downsize the projection optical system. Therefore, the overall cost reduction of the device can be achieved.

In a lens denoted by a reference character L10 in the drawing, a lens surface is formed as an aspherical lens surface, so that correction such as comatic aberration and spherical aberration is made. The lens denoted by the reference character L10 is located at a position at which the light flux transmits while shifting. For this reason, by forming the lens surface into an aspherical surface, high-order comatic aberration caused by oblique entering of the light flux into the lens is corrected.

In addition to this aspherical surface lens L10, the so-called rotational non-axisymmetric free curved surface plastic lenses denoted by the reference characters L11 and L12, which are some of projection lenses making up the above-described oblique projection optical system, and the rotational non-axisymmetric free curved surface plastic mirror denoted by the reference character M13 are attached.

For convenience in the explanation, the drawings show which point of each of the projection lenses (denoted by the reference characters L1 to L12 in the drawings) forming the projection lens a light flux φ2 which forms an image on an upper end part of the projection surface and a light flux φ1 which forms an image almost on a center part of the projection surface transmit through. The upper limit part of the light flux φ2 which forms the image on the upper end part of the projection surface and the lower limit part of the light flux φ1 which forms the image almost on the center part of the projection surface do not overlap each other at the rotational non-axisymmetric free curved surface lens L10 and the rotational non-axisymmetric free curved surface lenses L11 and L12, and therefore, the aberration can be corrected individually at the upper limit part and the lower limit part, so that correction performance can be significantly improved.

This tendency becomes further notable at the rotational non-axisymmetric free curved surface mirror M13. The lenses (L1 to L10) contributing to the aberration correction in a region relatively close to the optical axis are housed in a lens barrel B1, and the lenses (L11 and L12) contributing to the aberration correction in a region distant from the optical axis are housed in a lens barrel B2 which is different from the lens barrel for focus adjustment. Therefore, a distance between the lenses L10 and L11 and a distance between the lens 12 and the mirror 13 are adjusted, and besides, a distance between the lens L11 and the lens L12 is also adjusted at the same time.

Meanwhile, the rotational non-axisymmetric free curved surface mirror M13 is attached to a mirror base MB1, and has a structure that can be opened/closed by, for example, an electric motor (not shown). Further, all of them are all fixed with high accuracy to a projection lens base, so that a predetermined focus performance is achieved.

Figure 3:
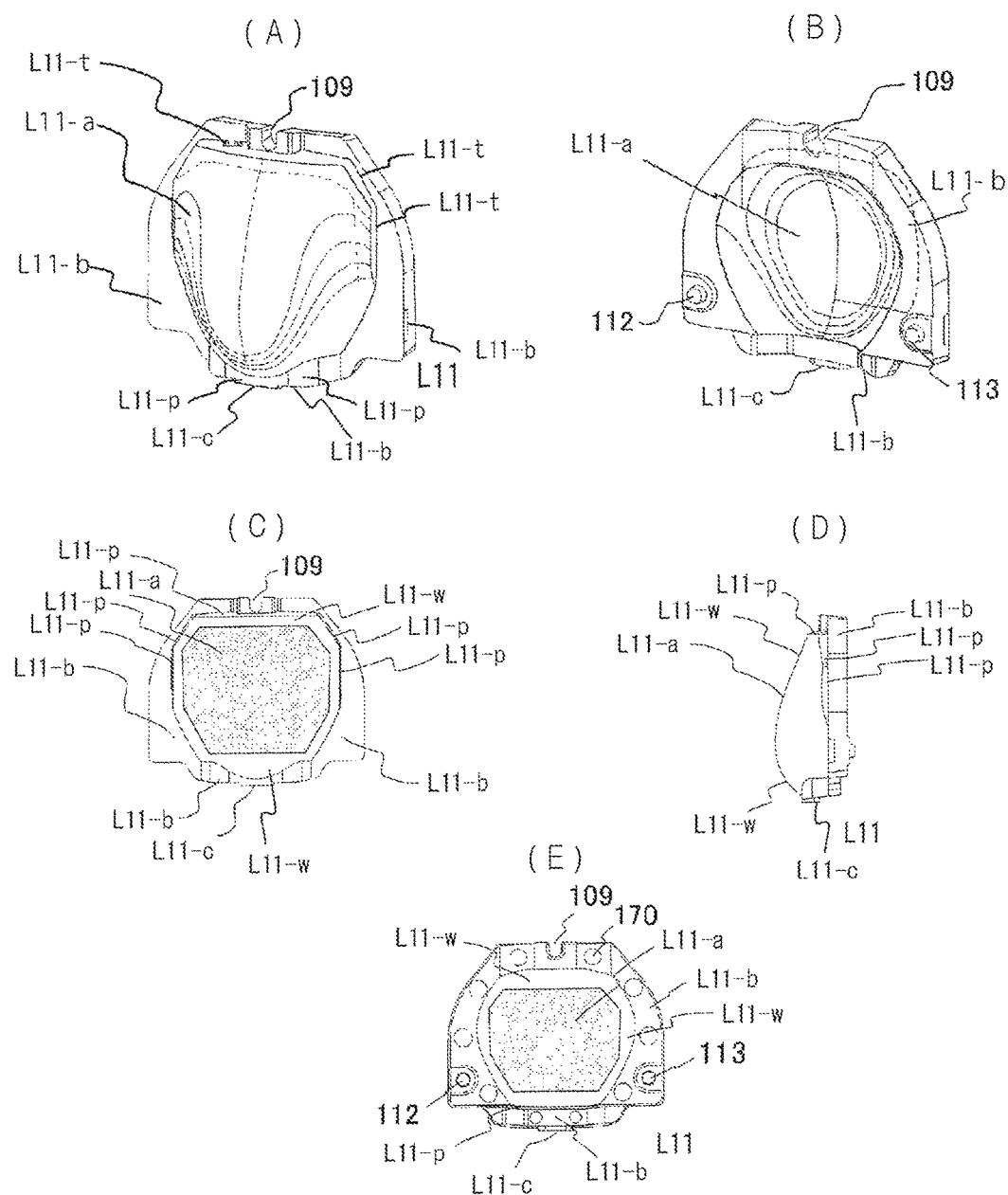
FIG. 3 is diagrams including a perspective view from a front side, a perspective view from a rear side, a front view, a side view, and a rear view illustrating an outer shape of a rotational non-axisymmetric free curved surface lens L11.

FIGS. 3(A) to 3(E) are diagrams each showing an outer shape of the above-described rotational non-axisymmetric free curved surface lens L11. FIG. 3(A) shows a perspective view of the lens L11 seen from its front side, FIG. 3(B) shows a perspective view of the lens L11 seen from its rear side, FIG. 3(C) shows a front view of the lens L11, FIG. 3(D) shows a side view of the lens L11, and FIG. 3(E) shows a rear view of the lens L11. This rotational non-axisymmetric free curved surface lens L11 is a plastic lens. As clearly seen from these diagrams, the lens L11 has a lens effective region L11-$a$ and a so-called lens edge part L11-$b$ that is formed on an outer periphery of the lens effective region L11-$a$ for positioning and holding the lens when being embedded in the lens barrel B2. Here, particularly, FIGS. 3(A) and 3(B) show a contour for showing a surface shape of the lens effective region L11-$a$ of the rotational non-axisymmetric free curved surface lens L11 by a broken line. A reference character L11-$c$ in the drawings denotes a gate used in injecting a resin.

Figure 4:
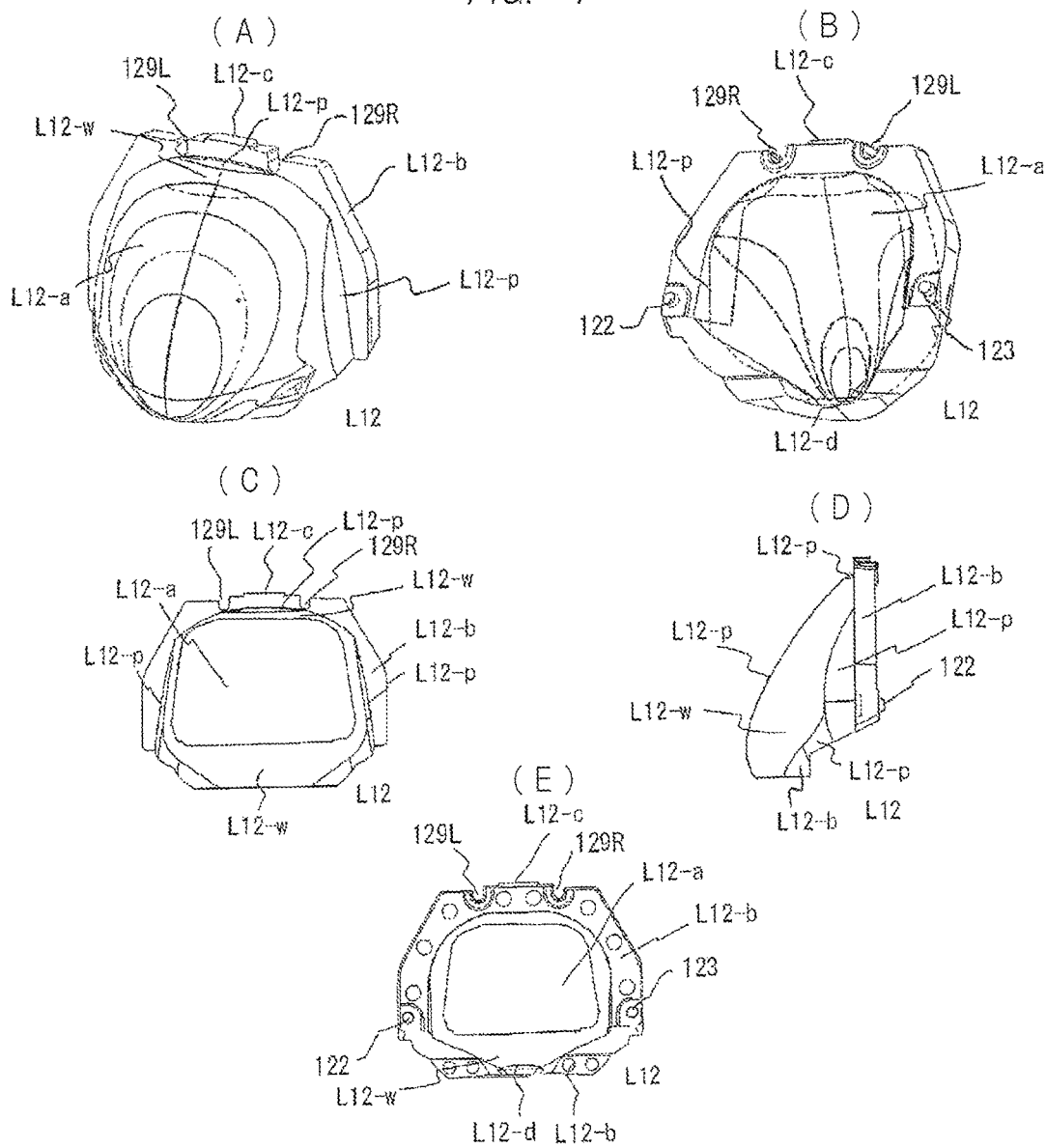
FIG. 4 is diagrams including a perspective view from a front side, a perspective view from a rear side, a front view, a side view, and a rear view illustrating an outer shape of a rotational non-axisymmetric free curved surface lens L12.

FIGS. 4(A) to 4(E) are diagrams each showing an outer shape of the above-described rotational non-axisymmetric free curved surface lens L12. As similar to the above description, FIG. 4(A) shows a perspective view of the lens L12 seen from its front side, FIG. 4(B) shows a perspective view of the lens L12 seen from its rear side, FIG. 4(C) shows a front view of the lens L12, FIG. 4(D) shows a side view of the lens L12, and FIG. 4(E) shows a rear view of the lens L12. This rotational non-axisymmetric free curved surface lens L12 is also a plastic lens as similar to the above description. As clearly seen from these diagrams, the lens L12 has a lens effective region L12-$a$ and a so-called lens edge part L12-$b$ that is formed on an outer periphery of the lens effective region L12-$a$ for positioning and holding the lens when being embedded in the lens barrel B2. Also here, particularly, FIGS. 4(A) and 4(B) show a contour for showing a surface shape of the lens effective region L12-$a$ of the rotational non-axisymmetric free curved surface lens L12 by a broken line. A reference character L12-$c$ in the drawings denotes a gate used in injecting a resin.

Figure 5:
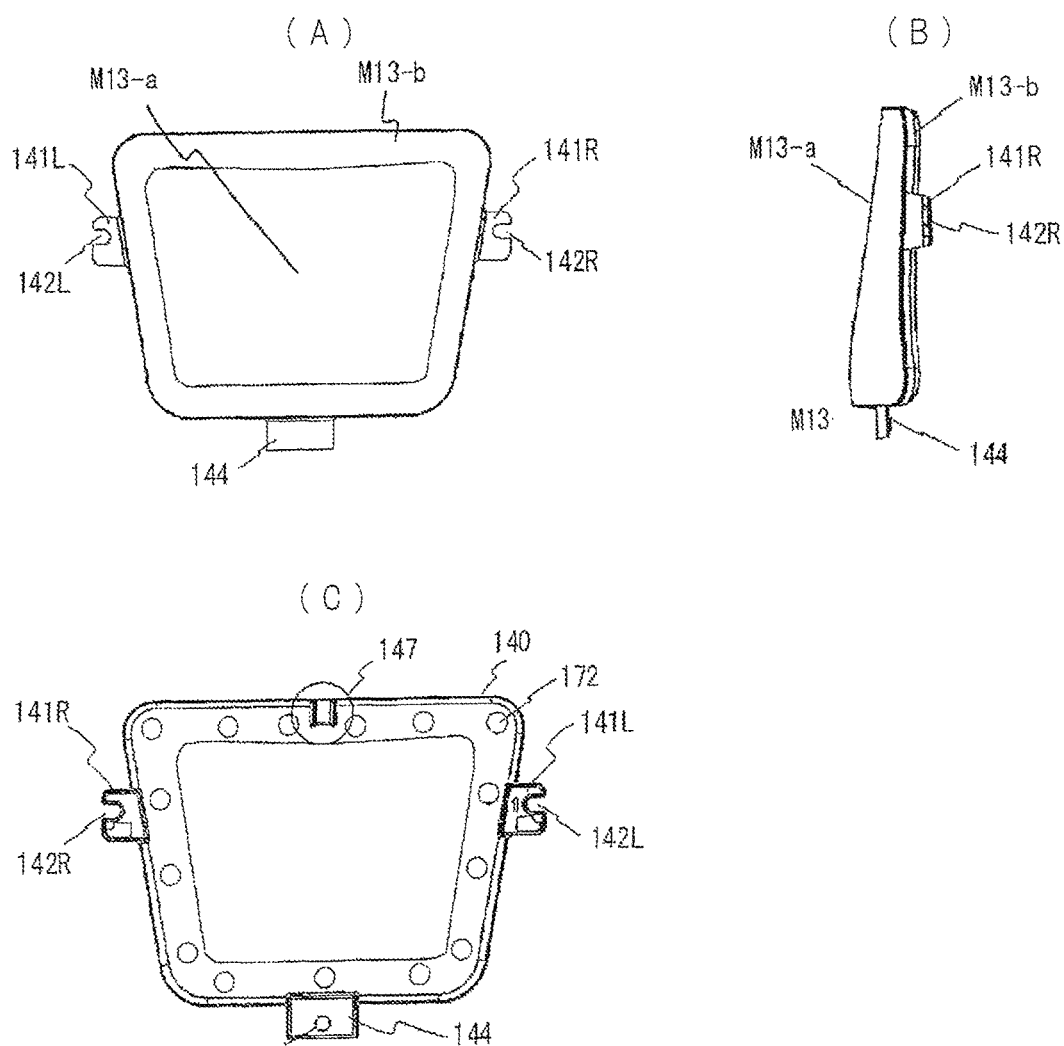
FIG. 5 is diagrams including a front view, a side view, and a rear view illustrating an outer shape of a rotational non-axisymmetric free curved surface mirror M13.

FIGS. 5(A) to 5(C) are diagrams each showing an outer shape of the above-described rotational non-axisymmetric free curved surface mirror M13. FIG. 5(A) shows a front view of the mirror M13, FIG. 5(B) shows a side view of the mirror M13, and FIG. 5(C) shows a rear view of the mirror M13. This rotational non-axisymmetric free curved surface mirror M13 is also a plastic lens. As clearly seen from these diagrams, the mirror M13 has a mirror effective region M13-$a$ and a mirror region (hereinafter, referred to as free curved surface region) that is formed on an outer periphery of the mirror effective region M13-$a$ so that its aspherical shape is extended as it is.

<Method for Manufacturing Rotational Non-Axisymmetric Free Curved Surface Lens and Rotational Non-Axisymmetric Free Curved Surface Mirror>

Figure 6:
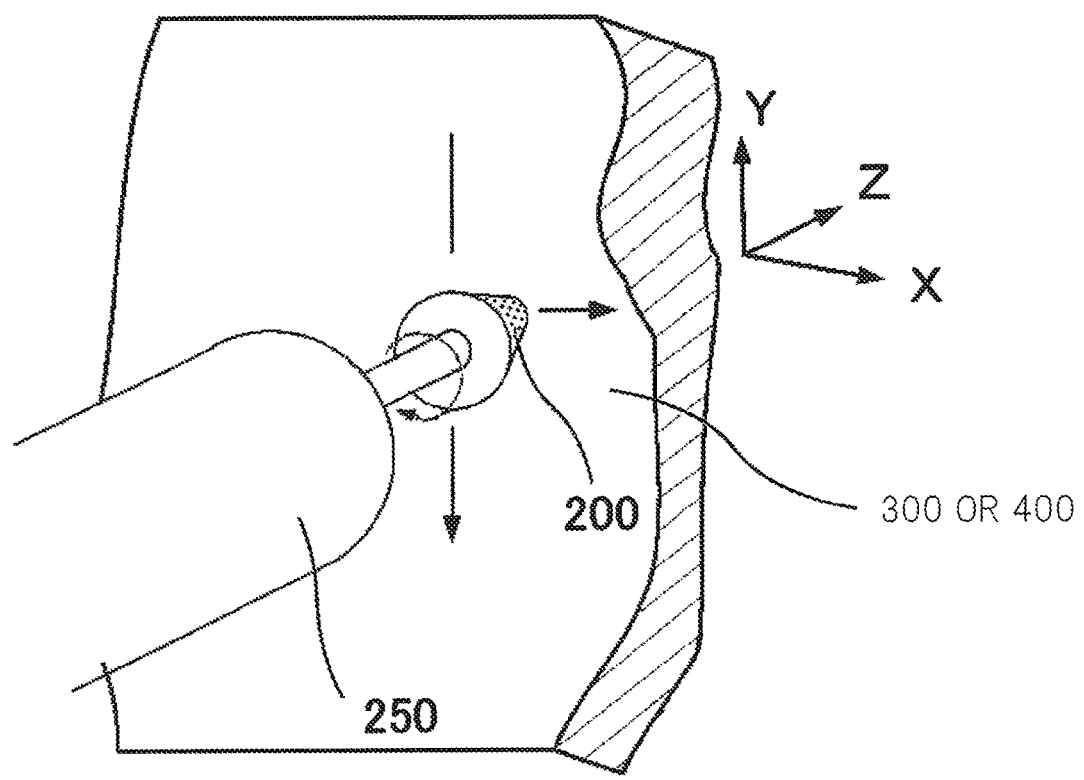
FIG. 6 is a diagram for explaining a general method for manufacturing a rotational non-axisymmetric free curved surface lens, a rotational non-axisymmetric free curved surface mirror, or a molding die for the lens or mirror.
Figure 10:
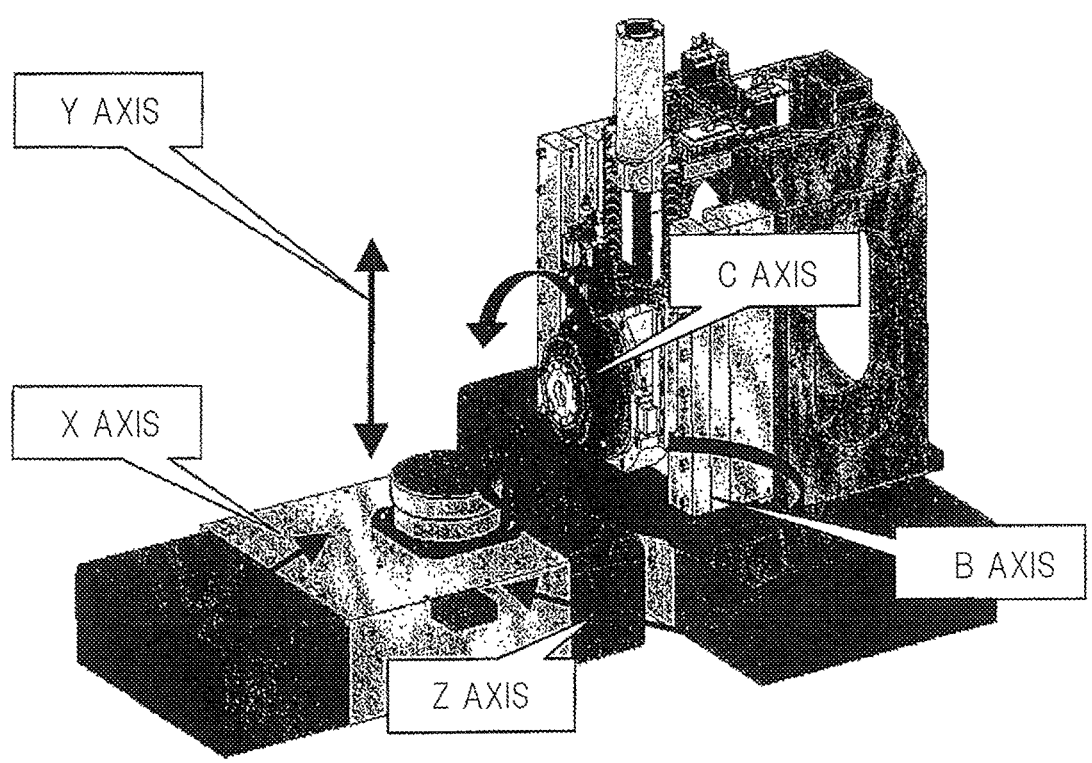
FIG. 10 is a diagram showing an example of a five-spindle machining device with which a rotational non-axisymmetric free curved surface lens or non-axisymmetric free curved surface mirror is manufactured by a cutting process.
Figure 11:
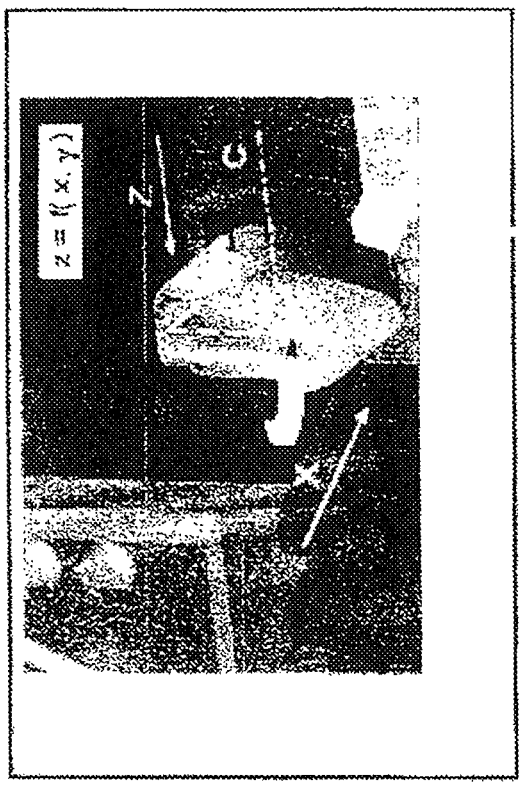
FIG. 11 is a diagram showing an example of a machining method performed by the machining device.
Figure 11:
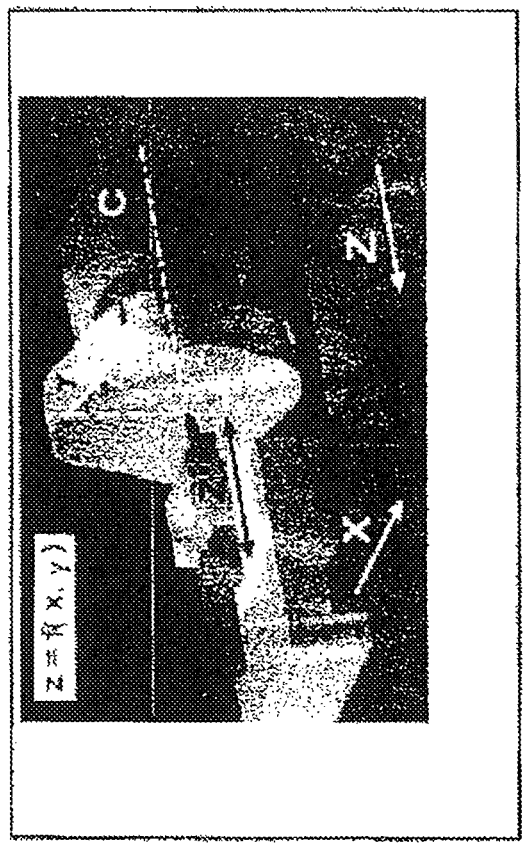

In general, the above-described rotational non-axisymmetric free curved surface lens and rotational non-axisymmetric free curved surface mirror are manufactured through a cutting process by a five-spindle machining device shown in FIGS. 10 and 11 or a grinding process shown in FIG. 6. Among the processes, in the grinding process, a desired lens surface with a non-axisymmetric free curved surface shape is formed while rotating a grinding tool 200 which is a machining tool having a spherical curvature smaller than the minimum curvature of the rotational non-axisymmetric free curved surface lens which is a workpiece by an electric motor 250 and while moving the tool with respect to (i.e., scanning) a surface 300 of the plastic or glass lens or mirror which is the fixed workpiece or a surface 400 of a molding die for the lens or mirror (in the case of manufacturing the lens or mirror by molding) in three-dimensional directions (X, Y, and Z directions in the drawing).

Figure 7:
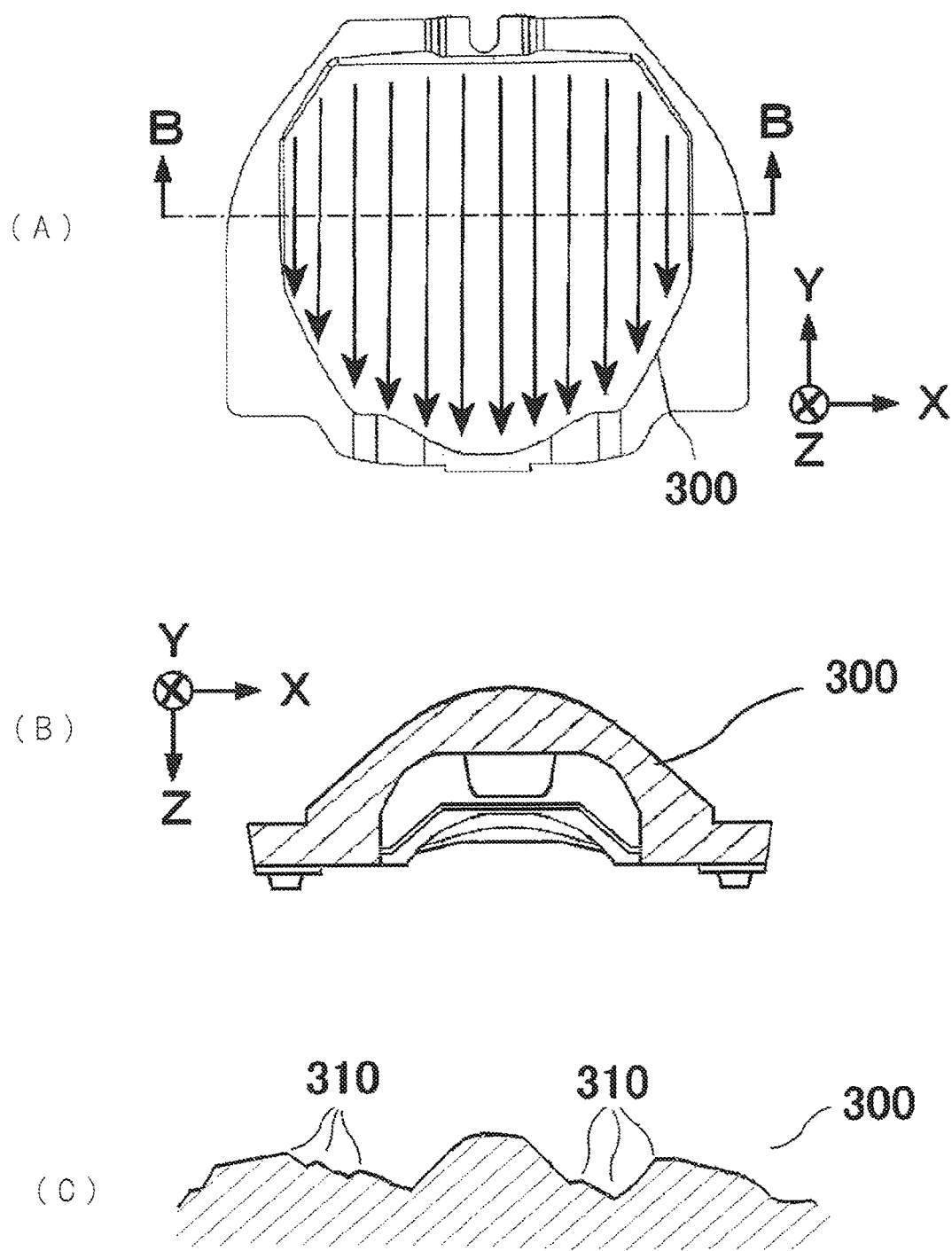
FIG. 7 is a front view of a rotational non-axisymmetric free curved surface lens manufactured by a method for manufacturing an optical element with a rotational non-axisymmetric free curved surface according to an embodiment of the present invention, a cross-sectional view of the lens taken along a line B-B, and a partially enlarged cross-sectional view of the lens.

At this time, according to the various knowledge of the inventors, particularly when the grinding tool 200 which is the machining tool is moved in the X and Y directions along the lens surface, the grinding tool 200 should be moved in the direction along the meridional surface of the projection lens if the lens is formed as the projection lens of FIG. 2. More specifically, for the non-axisymmetric free curved surface lens L12, as shown in FIG. 7, it has been found out that it is preferable to move the grinding tool 200 in the direction (Y direction) along the meridional surface of the projection lens, i.e., the lens, and then, sequentially move the tool in the direction (X direction) along the sagittal surface of the lens.

According to the studies made by the inventors, by the movement (scanning) of the grinding tool 200 which is the machining tool along the lens surface (in the X and Y directions), a micro-irregularity portion 310 is formed on the lens surface 300 as shown in FIG. 7(B) and FIG. 7(C) that is a partially enlarged view of FIG. 7(B) (in order to show the micro-irregularity portion 310 in the drawings, its height direction is emphatically shown). In the micro-irregularity portion of the surface 300 of the lens or mirror, an upper portion and a lower portion in a vertical direction of a screen of the image display surface are significantly different from each other in an incident angle of the image light beam in the case of the projection lens supporting for the oblique projection optical system. For example, when a horizontal line is displayed in the horizontal direction of the screen, a blur (flare) occurs on the upper portion of the screen in the vertical direction of the screen.

Accordingly, the inventors have obtained an occurrence state of the blur by experiments in the case of the formation of the irregularity portion 310 in the direction (Y direction) along the meridional surface and the case of the formation of the irregularity portion 310 in the direction (X direction) along the sagittal surface. As a result, in the case of the formation of the irregularity portion 310 in the direction (Y direction) along the meridional surface, the inventors have found out that a degree of the occurrence of the blur is reduced because the light scattering direction a right-and-left direction of the screen. In the aberration on the projection lens applied to the oblique projection optical system, an occurrence amount of the aberration in the sagittal direction is smaller in principle than an occurrence amount of the aberration in the meridional direction. Therefore, even if the above-described blur occurs in the horizontal direction of the screen, a focus performance balanced in the whole screen can be obtained. Note that FIG. 7(A) shows the front shape of the lens. In the drawing, the movement (scanning) direction of the grinding tool 200 which is the machining tool is shown by an arrow.

Figure 8:
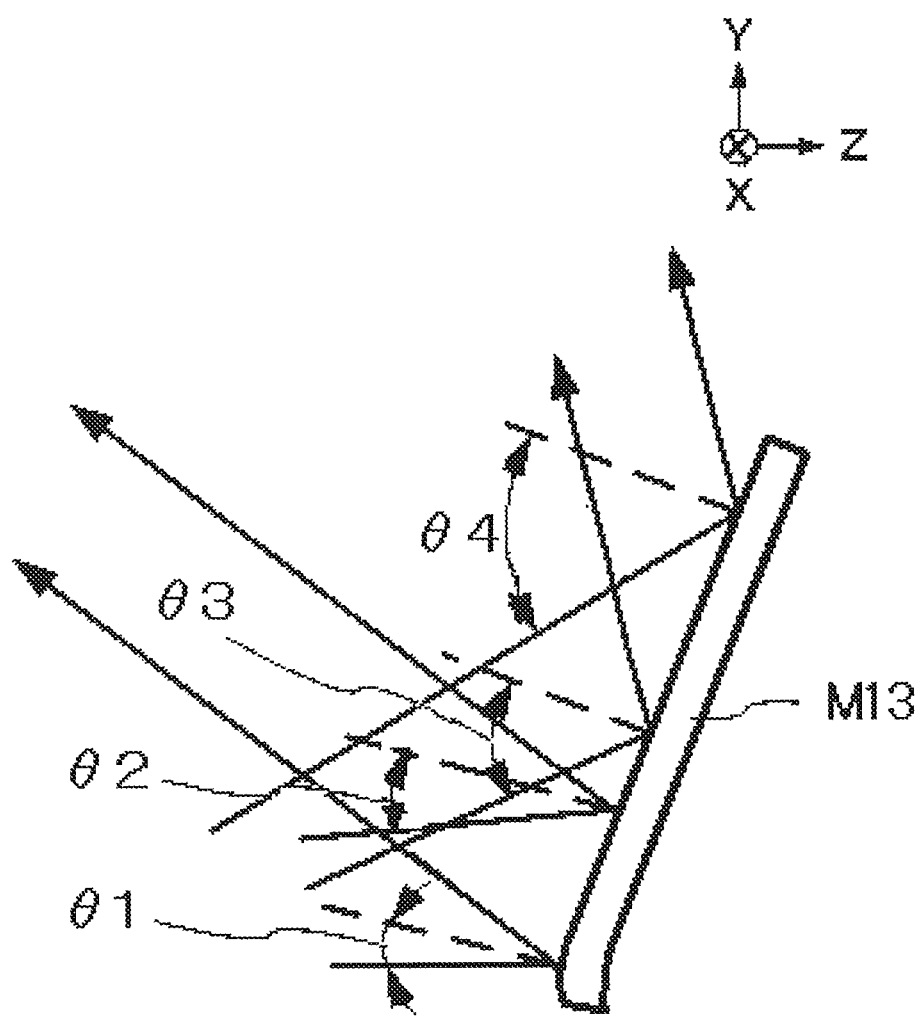
FIG. 8 is a diagram showing a state of incident light on a rotational non-axisymmetric free curved surface mirror manufactured by a method for manufacturing an optical element with a rotational non-axisymmetric free curved surface according to an embodiment of the present invention.

That is, in the example of the rotational non-axisymmetric free curved surface mirror M13 as shown in FIG. 8 in the case of the formation of the micro-irregularity on the lens surface in the sagittal-surface direction (X direction), the incident angle θ of the light becomes large ($\theta_4 > \theta_3 > \theta_2 > \theta_1$) particularly on an upper end part on the meridional surface, the upper end part being largely distant from the optical axis, and part of reflected light of the light causes light scattering, etc. Therefore, in an optical system having the micro-irregularity formed on the lens surface in the sagittal-surface direction (X direction), such a phenomenon that a plurality of projected images overlap each other on apart distant from the optical axis to create a blur image, etc., has observed.

That is, the present invention has been made based on the above-described knowledge of the inventors. Specifically, when the grinding tool 200 which is the machining tool is moved on (scans) the surface 300 of the plastic or glass lens or mirror which is the workpiece or on the surface 400 (that is, a plane defined by the X and Y axes) of the molding die which is the workpiece, a desired aspherical lens surface or molding die surface is formed while moving the grinding tool 200 in the direction (Y direction: longitudinal direction) along the meridional surface.

Figure 9:
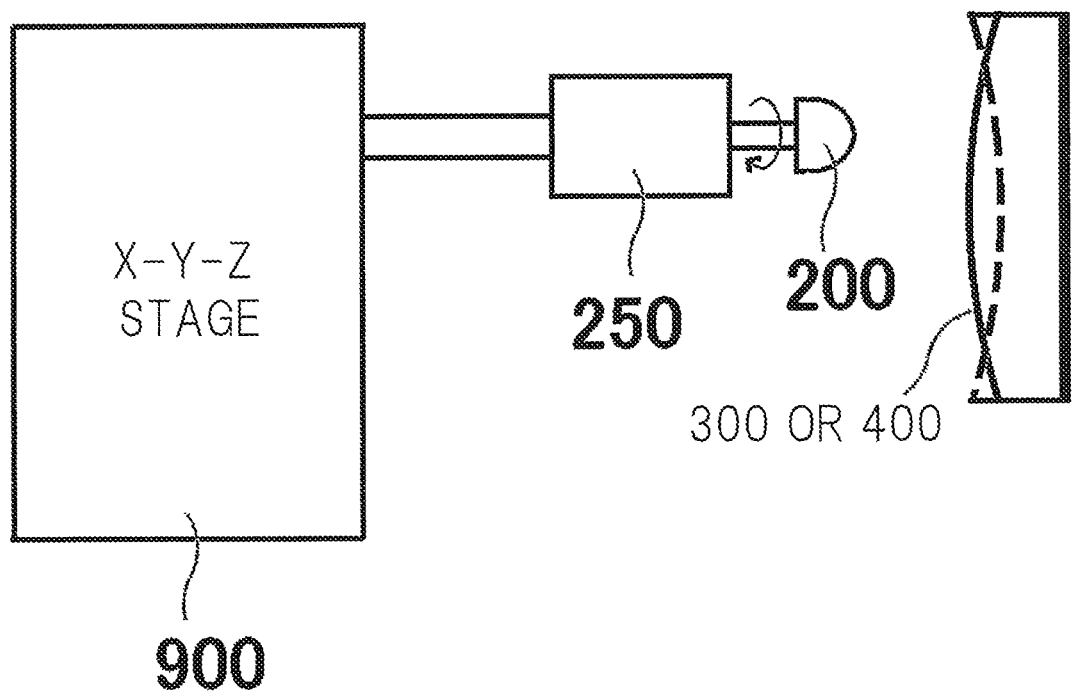
FIG. 9 is a diagram showing an outline of a device configuration for achieving a method for manufacturing an optical element with a rotational non-axisymmetric free curved surface according to an embodiment of the present invention.

More specifically, as shown in FIG. 9, the grinding tool 200 which is the machining tool is attached to a distal end of an arm of an X-Y-Z stage 900 that is freely movable in the X, Y, and Z directions, and the surface 300 of the plastic or glass lens or mirror or the surface 400 of the molding die (in the case of manufacturing the lens or mirror by molding) which is the workpiece is fixed at a position opposite to the grinding tool 200. A reference character "250" in the drawing denotes an electric motor that rotates the grinding tool 200.

Alternatively, instead of the above-described configuration, the workpiece may be freely movable in the X, Y, and Z directions while fixing the grinding tool 200. Alternatively, while both of them are configured to be movable, necessary grinding may be performed at the respective positions. Also at this time, note that the lens surface with the rotational non-axisymmetric free curved surface shape or the molding surface of the molding die is formed while moving the grinding tool 200 which is the machining tool in the direction (Y direction: longitudinal direction) along the meridional surface.

Regarding the movement (scanning) of the grinding tool 200, the movement from the upper part to the lower part or from the lower part to the upper part of the lens surface has been described above. However, the present invention is not limited to the movement. For example, the grinding tool 200 may be moved from the upper part to the lower part of the lens surface first, and then, moved from the lower part to the upper part, and subsequently repeats this movement. Alternatively, it may be moved upward or downward from the center of the lens surface.

Note that the above-described explanation has been mainly made in detail about the method for manufacturing the lens and reflection mirror having an aspherical surface mounted on the projection-type image display device (projector). However, the method of the present invention is not limited to this. For example, for those who skilled in the art, as similar to the above description, it is needless to say that the manufacturing method of the present invention is applied also to a rotational non-axisymmetric free curved surface lens, a rotational non-axisymmetric free curved surface reflection mirror, etc., which are required to make up an optical element of a vehicular image projection device embedded in a head lamp or attached to a front end of a vehicle or embedded in a tail lamp or attached to a rear end of a vehicle to project various pieces of information necessary for running and driving the vehicle on the road surface.

In the foregoing, the embodiments of the present invention have been described in detail. However, the present invention is not limited the above-described embodiments, and includes various modification examples. For example, the above-described embodiments have described the whole device in detail in order to understandably describing the present invention, and do not limit one including all structures explained above. Also, a part of the structure of one embodiment can be replaced with the structure of the other embodiment, and besides, the structure of the other embodiment can be added to the structure of one embodiment. Further, the other structure can be added to/eliminated from/replaced with a part of the structure of each embodiment.

EXPLANATION of REFERENCE CHARACTERS

100 . . . projection-type image display device, L11 and L12 . . . rotational non-axisymmetric free curved surface lens, L11-a and L12-a . . . lens effective region, M13 . . . rotational non-axisymmetric free curved surface mirror, M13-a . . . mirror effective region, 200 . . . machining tool (grinding tool), 250 . . . electric motor, 300 . . . surface of the lens or mirror, 400 . . . surface of the molding die

The invention claimed is:

1. A method for machining and forming a lens including a first surface that is a rotationally-asymmetric and non-axisymmetric surface at least a part of which has a free-form surface or an eccentric aspherical surface, the method comprising:
the first surface of a surface of the lens being formed while scanning a surface of a workpiece in three-dimensional movement by using a grinding or cutting machine, including
a first step of grinding or cutting the first surface by using the grinding or cutting machine while moving and scanning in a first direction along a meridional surface of the first surface, the first direction corresponding to an in-plane vertical direction of an image surface and a second direction corresponding an in-plane horizontal direction, the first direction and the second direction forming the first surface; and
a second step of repeating the first step while sequentially moving the grinding or cutting machine in the second direction,
wherein the grinding or cutting machine is a machining tool configured to be attached to a stage in which the three-dimensional movement is controlled, to be arranged at a position corresponding to a position of the surface of the workpiece, and to be controlled in rotational driving around a rotational axis crossing the surface, while the workpiece is configured to be fixed, so that the formation is performed, or
wherein the workpiece is configured to be attached to the stage in which the three-dimensional movement is controlled, while the grinding or cutting machine is a machining tool configured to be arranged at the position corresponding to the position of the surface of the workpiece, to be controlled in the rotational driving around the rotational axis crossing the surface, and to be fixed, so that the formation is performed.

2. A method for machining and forming a lens molding die including a first surface that is a rotationally-asymmetric non-axisymmetric surface at least a part of which includes a free-form surface or an eccentric aspherical surface, the method comprising:
the first surface being formed while scanning a surface of a workpiece in three-dimensional movement by using a grinding or cutting machine, including
a first step of grinding or cutting the first surface by using the grinding or cutting machine while moving and scanning in a first direction along a meridional surface of the first surface, the first direction corresponding to an in-plane vertical direction of an image surface and a second direction corresponding to an in-plane horizontal direction, the first direction and the second direction forming the first surface; and
a second step of repeating the first step while sequentially moving the grinding or cutting machine in the second direction,
wherein the grinding or cutting machine is a machining tool configured to be attached to a stage in which the three-dimensional movement is controlled, to be arranged at a position corresponding to a position of the surface of the workpiece, and to be controlled in rotational driving around a rotational axis crossing the surface, while the workpiece is fixed, so that the formation is performed, or
wherein the workpiece is configured to be attached to a stage in which the three-dimensional movement is controlled, while the grinding or cutting machine is a machining tool configured to be arranged at a position corresponding to a position of the surface of the workpiece, to be controlled in rotational driving around the rotational axis crossing the surface, and to be fixed, so that the formation is performed.

3. A method for machining and forming a mirror including a first surface that is a rotationally-asymmetric non-axisymmetric surface at least a part of which includes a free-form surface or an eccentric aspherical surface, the method comprising:
the first surface being formed while scanning a surface of a workpiece in three-dimensional movement by using a grinding or cutting machine, including
a first step of grinding or cutting the first surface by using the grinding or cutting machine while moving the scanning in a first direction along a meridional surface of the first surface, the first direction corresponding to an in-plane vertical direction of an image surface and a second direction corresponding to an in-plane horizontal direction, the first direction and the second direction forming the first surface; and
a second step of repeating the first step while sequentially moving the grinding or cutting machine in the second direction,
wherein the grinding or cutting machine is a machining tool configured to be attached to a stage in which the three-dimensional movement is controlled, to be arranged at a position corresponding to a position of the surface of the workpiece, and to be controlled in rotational driving around a rotational axis crossing the surface, while the workpiece is configured to be fixed, so that the formation is performed, or
wherein the workpiece is configured to be attached to the stage in which the three-dimensional movement is controlled, while the grinding or cutting machine is a machining tool configured to be arranged at a position corresponding to a position of the surface of the workpiece, to be controlled in rotational driving around the rotational axis crossing the surface, and to be fixed, so that the formation is performed.

4. A method for machining and forming a mirror molding die including a first surface that is a rotationally-asymmetric and non-axisymmetric surface at least a part of which includes a free-form surface or an eccentric aspherical surface, the method comprising:
the first surface being formed while scanning a surface of a workpiece in three-dimensional movement by using a grinding or cutting machine, a first step of grinding or cutting the first surface by using the grinding or cutting machine while moving and scanning in a first direction along a meridional surface of the first surface, the first direction corresponding to an in-plane vertical direction of an image surface and a second direction corresponding to an in-plane horizontal direction, the first direction and the second direction forming the first surface; and a second step of repeating the first step while sequentially moving the grinding or cutting machine in the second direction, wherein the grinding or cutting machine is a machining tool configured to be attached to a stage in which the three-dimensional movement is controlled, to be arranged at a position corresponding to a position of the surface of the workpiece, and to be controlled in rotational driving around a rotational axis crossing the surface, while the workpiece is configured to be fixed, so that the formation is performed, or wherein the workpiece is configured to be attached to the stage in which the three-dimensional movement is controlled, while the grinding or cutting machine is a machining tool configured to be arranged at a position corresponding to a position of the surface of the workpiece, to be controlled in rotational driving around the rotational axis crossing the surface, and to be fixed, so that the formation is performed.

5. The method for manufacturing the lens according to claim 1, wherein the lens is a lens configuring an oblique projection optical system, and the first direction corresponds to an in-plane vertical direction of a projection image display surface.

6. The method for manufacturing the molding die for the lens according to claim 2, wherein the lens molding die is a lens molding die configuring an oblique projection optical system, and the first direction corresponds to an in-plane vertical direction of a projection image display surface.

7. The method of manufacturing the mirror according to claim 3, wherein the mirror is a mirror configuring an oblique projection optical system, and the first direction corresponds to an in-plane vertical direction of a projection image display surface.

8. The method for manufacturing the molding die for the mirror according to claim 4, wherein the mirror molding die is a mirror molding die configuring an oblique projection optical system, and the first direction corresponds to an in-plane vertical direction of a projection image display surface.

9. A lens manufactured by the method for manufacturing according to claim 1.

10. A molding die manufactured by the method for manufacturing according to claim 2.

\* \* \* \* \*